UNITED STATES PATENT OFFICE.

SAMUEL H. JOHNSON, OF STRATFORD, COUNTY OF ESSEX, ENGLAND.

PRODUCTION OF SACCHARINE SUBSTANCES.

SPECIFICATION forming part of Letters Patent No. 244,902, dated July 26, 1881.

Application filed May 25, 1881. (No specimens.) Patented in England October 23, 1880.

*To all whom it may concern:*

Be it known that I, SAMUEL HENRY JOHNSON, F. C. S., a subject of the Queen of Great Britain, residing at Stratford, in the county of Essex, England, have invented certain new and useful Improvements in the Production of Saccharine Substances, (for which I have received Letters Patent in England, No. 4,334, dated October 23, 1880;) and I do hereby declare that the following is a full, clear, and exact description of the invention, which will enable others skilled in the art to which it appertains to make and use the same.

In the specification of a former patent granted to me, No. 186,935, in the year 1876, I described a process for obtaining saccharine substances from what in that specification I called "permeable grain containing starch." I have now discovered that by the process described in that specification I am able to obtain a large percentage of saccharine substances from the cellular tissues of vegetable substances from which all starch has been extracted—as, for example, from brewers' or distillers' grains from which all starch has been extracted by the ordinary mashing process, and also from other vegetable tissues in which no starch is contained. If such brewers' or distillers' grains are treated with weak acid and afterward subjected to steam at a high temperature, as described in the above specification, they will yield further quantities of fermentable matters, such as maltose and dextrose, in addition to other carbo-hydrates or extractive matters which are not fermentable. Also, in the specification of the above-mentioned patent the conversion of what was therein called "permeable grain" was effected, first, by the action upon it, after it had been steeped in weak acid, of steam at a high pressure, and next, in some cases, by injecting into it superheated water. I have now found that a good conversion may also be effected by the direct injection of superheated water without the preliminary steaming. This method of proceeding is applicable not only for treating permeable grain containing starch, but also for treating cellular tissue in which but little, if any, starch is contained.

Having thus described the nature of my invention, I will proceed to describe more fully the manner of performing the same.

To obtain saccharine substances from brewers' or distillers' grains, or from vegetable cellular tissue containing but little, if any, starch, I mix the grains or tissue with about twenty-four per cent. of their weight of dilute hydrochloric acid, of specific gravity about 1.060, until the acid is absorbed by the grain. The mixing may advantageously be effected in a revolving vessel. After the acid has been allowed to remain in contact with the grains for about twenty-four hours they are introduced into a strong wrought-iron vessel lined with lead. The vessel is of the form of an inverted truncated cone. At the top it is provided with an opening for the introduction of the prepared grain, and this opening can be hermetically closed by a suitable lid. At the lower end of the vessel is a perforated false bottom, on which the material rests, and below this is a steam-cock, through which steam can be introduced. Steam at a pressure of about sixty to ninety pounds to the square inch is allowed to blow into the vessel through this cock, and permeates throughout the material in the vessel. After a time the contents become liquid, and are agitated by the ingoing current of steam. When the conversion is completed, which requires about two to ten minutes, the contents of the vessel are forced out through draw-off cocks into suitable vessels provided with agitators, wherein the acid can be neutralized by means of a carbonate of an alkali or an alkaline earth. Subsequently, in order to separate the glucose from the insoluble matter accompanying it, it is diluted with water and filtered by any convenient method.

In place of using steam only in the process of conversion, as above described, a measured quantity of water at a temperature of about 305° Fahrenheit may be introduced into the vessel, after previously acting upon it with steam.

To allow of superheated water being thus introduced into the vessel the bottom of the vessel may be connected by a suitable cock and pipe with a water-measuring chamber or vessel having in front a gage to enable the man working the apparatus to know the quantity of water in the measure. The water-measuring chamber is first filled from a steam-boiler at the required pressure with the desired amount of superheated water. The communication with the water-space of the steam-boiler is then cut off by closing a cock, and the cock on the pipe leading from the bottom of the water-measuring chamber to the bottom of the converting-vessel is opened, and the water is discharged into the converter, steam only being left in the measuring-chamber. The cock on the pipe leading to the converter can then be closed.

When I use superheated water alone for effecting the conversion of permeable grain containing starch or spent brewers' grains, or other vegetable tissue previously prepared by admixture of weak acid, without previously subjecting it to a preliminary steaming process, the water-measuring chamber should be formed to contain rather a larger quantity of water than when steam is previously used. Preferably I employ for every hundred-weight of brewers' grains or permeable grain about eight to twelve gallons of water at a temperature of about 305° Fahrenheit, and introduce the whole quantity of water at once into the converting-vessel. Afterward steam under pressure is blown into the converting-vessel through the perforated false bottom to keep up the temperature of the liquid in the vessel and keep it agitated until the conversion is completed.

In place of using hydrochloric acid in the above-described processes, sulphuric acid may be substituted for it in such proportion as that there may be present in the material under treatment about one to five per cent. of real acid, calculated upon the weight of the material.

The converting-vessel may be made of an alloy of tin and copper, 1.9.

Having thus described the nature of my invention and the manner of performing the same, I would have it understood that I claim—

1. The hereinbefore-described process of obtaining saccharine substances from brewers' or distillers' grains, or other vegetable tissue containing but little or no starch, said process consisting in treating such tissue with dilute acid, introducing it thus prepared, or after absorption of the acid, into the converter, liquefying or converting it, drawing off the contents of the converter, neutralizing the acid, and separating the glucose from the insoluble matter accompanying it, all substantially as set forth.

2. The treatment of acidified grain in a permeable condition, or acidified brewers' or distillers' grains, or other acidified vegetable tissue containing but little or no starch, by the injection into them of superheated water without any previous injection of steam, substantially as described, to obtain saccharine substances therefrom.

London, May 9, 1881.

SAML. H. JOHNSON.

Witnesses:
CHAS. BERKLEY HARRIS,
THOMAS LAKE,
*Both of 17 Gracechurch Street, London.*